United States Patent
Zhou et al.

(10) Patent No.: US 12,358,392 B2
(45) Date of Patent: Jul. 15, 2025

(54) METHOD AND DEVICE FOR CONTROLLING VEHICLE CHARGING AND VEHICLE

(71) Applicant: GREAT WALL MOTOR COMPANY LIMITED, Hebei (CN)

(72) Inventors: Mingwang Zhou, Hebei (CN); Shujiang Chen, Hebei (CN); Qing Zhao, Hebei (CN); Tong Kang, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 268 days.

(21) Appl. No.: 17/927,084

(22) PCT Filed: Jun. 30, 2021

(86) PCT No.: PCT/CN2021/103840
§ 371 (c)(1),
(2) Date: Nov. 22, 2022

(87) PCT Pub. No.: WO2022/022215
PCT Pub. Date: Feb. 3, 2022

(65) Prior Publication Data
US 2023/0211694 A1    Jul. 6, 2023

(30) Foreign Application Priority Data
Jul. 30, 2020  (CN) .......................... 202010752568.4

(51) Int. Cl.
*B60L 53/66*    (2019.01)
*B60L 53/16*    (2019.01)

(52) U.S. Cl.
CPC .............. *B60L 53/66* (2019.02); *B60L 53/16* (2019.02)

(58) Field of Classification Search
CPC .......... B60L 53/66; B60L 53/16; B60L 53/63; B60L 2240/70; B60L 3/0023;
(Continued)

(56) References Cited

U.S. PATENT DOCUMENTS

| 10,369,974 | B2 * | 8/2019 | Carlson | .................. F17C 5/007 |
| 2004/0134267 | A1 * | 7/2004 | Boesch | .................. H02P 25/08 |
| | | | | 73/114.62 |

(Continued)

FOREIGN PATENT DOCUMENTS

| CN | 106527216 A | 3/2017 |
| CN | 106828156 A | 6/2017 |

(Continued)

OTHER PUBLICATIONS

International Search Report for PCT/CN2021/103840 issued Oct. 9, 2021.

*Primary Examiner* — Mussa A Shaawat
(74) *Attorney, Agent, or Firm* — Schmeiser, Olsen & Watts LLP

(57) ABSTRACT

A method and a device for controlling vehicle charging, a program, a medium, and a vehicle is provided. The method by acquiring a current connection state of a telematics box in the vehicle and the server when a charging gun of a vehicle is determined in a connection state; and recording a first duration of the offline state when the current connection state is determined in an offline state, and controlling the vehicle charging according to the first duration. In this way, when it is determined that the current connection state is in the offline state, the vehicle charging can be controlled according to the duration of the offline state, which can effectively avoid the problem of charging failure due to network connection failure during the reservation charging process, the reliability of vehicle reservation charging is (Continued)

improved, and thus the vehicle user experience is effectively improved.

19 Claims, 4 Drawing Sheets

(58) Field of Classification Search
CPC ............. B60L 2210/30; B60L 2250/12; B60L 2250/14; B60L 2260/50; B60L 53/14; B60L 53/305; B60L 58/12; H02J 2310/48; H04L 67/125; G06Q 50/06; G06Q 10/02
See application file for complete search history.

(56) References Cited

U.S. PATENT DOCUMENTS

| | | | | |
|---|---|---|---|---|
| 2012/0095790 | A1* | 4/2012 | Stefik | G07B 15/02 705/5 |
| 2014/0292072 | A1* | 10/2014 | Nakanishi | B60L 58/22 324/426 |
| 2016/0176307 | A1* | 6/2016 | Becker | B60L 53/31 320/109 |
| 2016/0375893 | A1* | 12/2016 | Nefcy | B60W 30/18127 180/65.265 |
| 2019/0270384 | A1* | 9/2019 | Liu | B60L 7/20 |
| 2020/0003571 | A1* | 1/2020 | Shirakawa | G06Q 50/10 |
| 2020/0254897 | A1* | 8/2020 | Loghavi | B60L 53/67 |
| 2020/0380429 | A1* | 12/2020 | Kawamoto | G06Q 10/083 |
| 2021/0155240 | A1* | 5/2021 | Hashimoto | B60L 3/108 |
| 2022/0111747 | A1* | 4/2022 | Goei | B60L 53/66 |
| 2022/0194239 | A1* | 6/2022 | Zhu | H02K 11/33 |

FOREIGN PATENT DOCUMENTS

| | | |
|---|---|---|
| CN | 107919707 A | 4/2018 |
| CN | 108116251 A | 6/2018 |
| CN | 207683369 U | 8/2018 |
| CN | 108674232 A | 10/2018 |
| CN | 108790867 A | 11/2018 |
| CN | 108973734 A | 12/2018 |
| CN | 109004719 A | 12/2018 |
| CN | 109624739 A | 4/2019 |
| CN | 110071338 A | 7/2019 |
| CN | 110143154 A | 8/2019 |
| CN | 110626186 A | 12/2019 |
| JP | 2018157718 A | 10/2018 |
| KR | 20190103925 A | 9/2019 |
| WO | 2012081520 A1 | 6/2012 |

* cited by examiner

METHOD AND DEVICE FOR CONTROLLING VEHICLE CHARGING AND VEHICLE

CROSS-REFERENCE TO RELATED APPLICATIONS

This application claims priority to PCT/CN2021/103840, having a filing date of Jun. 30, 2021, which is based on Chinese Patent Application No. 202010752568.4, having a filing date of Jul. 30, 2020, the entire contents both of which are hereby incorporated by reference.

FIELD OF TECHNOLOGY

The following relates to the technical field of vehicles, and more particularly to a method and a device for controlling vehicle charging, and a vehicle.

BACKGROUND

For electric vehicles, in order to reasonably allocate the vehicle charging time and ensure that the vehicle has sufficient power when the user is using the vehicle, developers have developed the reservation charging function. The reservation charging function is provided by Telematics Service Provider (TSP), which realizes the reservation charging control through the data interaction between the vehicle and TSP.

However, because the data interaction in the control process of reservation charging depends on the network, in the actual application process, when the vehicle is in an underground parking lot, an enclosed garage or other places with weak network signals, the phenomenon of reservation charging failure often occurs, that is, when the time of reservation using the vehicle is set, the vehicle cannot be charged at the time of charging, which leads to the current residual power of the vehicle cannot meet the demand for endurance when the user needs to use the vehicle, which greatly affects the user experience.

SUMMARY

An aspect relates to a method and a device for controlling vehicle charging, and a vehicle.

In order to achieve above-mentioned aspect, a first aspect of the present disclosure provides a method for controlling vehicle charging, applied to a server, and the method includes:
acquiring, through a head unit system, a current connection state of a telematics box in the vehicle and the server when a charging gun of a vehicle is determined in a connection state; and
recording, through a timer in the server, a first duration of the offline state when the current connection state is determined in an offline state, and controlling, through the hybrid control unit, the vehicle charging according to the first duration.

In an embodiment, before the step of acquiring a current connection state of a telematics box in the vehicle and the server, the method further comprises:
acquiring a time for reservation using the vehicle through a terminal; and
determining a waiting duration from a start of charging according to the time for reservation using the vehicle; the step of controlling the vehicle charging according to the first duration includes: updating the waiting duration according to the first duration to generate a target waiting duration when the first duration is determined to be less than or equal to a preset duration threshold; and
sending the target waiting duration to the telematics box to control the vehicle charging when a timing duration of the telematics box reaches the target waiting duration.

In an embodiment, the step of updating the waiting duration according to the first duration to generate a target waiting duration includes:
acquiring a first difference between the waiting duration and the first duration; and
determining the first difference as the target waiting duration.

In an embodiment, the step of determining a waiting duration from a start of charging according to the time for reservation using the vehicle includes:
acquiring a preset advance charging duration and a power on duration required for fully charging of the vehicle;
acquiring a target sum value of the preset advance charging duration and the power on duration;
acquiring a second duration between a current time and the time for reservation using the vehicle;
determining a second difference between the second duration and the target sum value; and
determining the second difference as the waiting duration.

In an embodiment, the method further includes:
sending the waiting duration to the telematics box when the current connection state is determined in an online state, to control the vehicle charging when the timing duration of the telematics box reaches the waiting duration.

In an embodiment, the step of controlling the vehicle charging according to the first duration includes:
controlling the vehicle charging when the first duration is determined to be greater than the preset duration threshold.

A second aspect of the present disclosure provides a device for controlling vehicle charging, applied to a server, and the device includes:
a hybrid control unit, configured for acquiring a current connection state of a telematics box in the vehicle and the server when a charging gun of a vehicle is determined in a connection state; and
a control module, configured for recording a first duration of an offline state when the current connection state is determined in the offline state, and controlling the vehicle charging according to the first duration.

In an embodiment, the device further includes:
a second acquisition module, configured for acquiring a time for reservation using the vehicle through a terminal; and
a determination module, configured for determining a waiting duration from a start of charging according to the time for reservation using the vehicle; and
the control module includes:
an update sub-module, configured for updating the waiting duration according to the first duration to generate a target waiting duration when the first duration is determined to be less than or equal to a preset duration threshold; and
a sending sub-module, configured for sending the target waiting duration to the telematics box, to control the vehicle charging when a timing duration of the telematics box reaches the target waiting duration.

In an embodiment, the update sub-module is configured for:
acquiring a first difference between the waiting duration and the first duration; and
determining the first difference as the target waiting duration.

In an embodiment, the determination module includes:
a first acquisition sub-module, configured for acquiring a preset advance charging duration and a power on duration required for fully charging of the vehicle;
a second acquisition sub-module, configured for acquiring a target sum value of the preset advance charging duration and the power on duration;
a third acquisition sub-module, configured for acquiring a second duration between a current time and the time for reservation using the vehicle;
a first determination sub-module, configured for determining a second difference between the second duration and the target sum value; and
a second determination sub-module, configured for determining the second difference as the waiting duration.

In an embodiment, the device further includes:
a sending module, configured for sending the waiting duration to the telematics box when the current connection state is determined in an online state, to control the vehicle charging when the timing duration of the telematics box reaches the waiting duration.

In an embodiment, the hybrid control unit is further configured for:
controlling the vehicle charging when the first duration is determined to be greater than the preset duration threshold.

A third aspect of the present disclosure provides a vehicle, which includes the device for controlling vehicle charging as described above.

Through the above technical solution, acquiring a current connection state of a telematics box in the vehicle and the server when a charging gun of a vehicle is determined in a connection state; and recording a first duration of the offline state when the current connection state is determined in an offline state, and controlling the vehicle charging according to the first duration. In this way, when it is determined that the current connection state is in the offline state, the vehicle charging can be controlled according to the duration of the offline state, which can effectively avoid the problem of charging failure due to network connection failure during the reservation charging process, the reliability of vehicle reservation charging is improved, and thus the vehicle user experience is effectively improved.

Additional aspects and advantages of the present disclosure will be given in part in the following description, and some will become apparent from the following description, or learned from the practice of the present disclosure.

BRIEF DESCRIPTION

Some of the embodiments will be described in detail, with references to the following Figures, wherein like designations denote like members, wherein.

Figure 5:
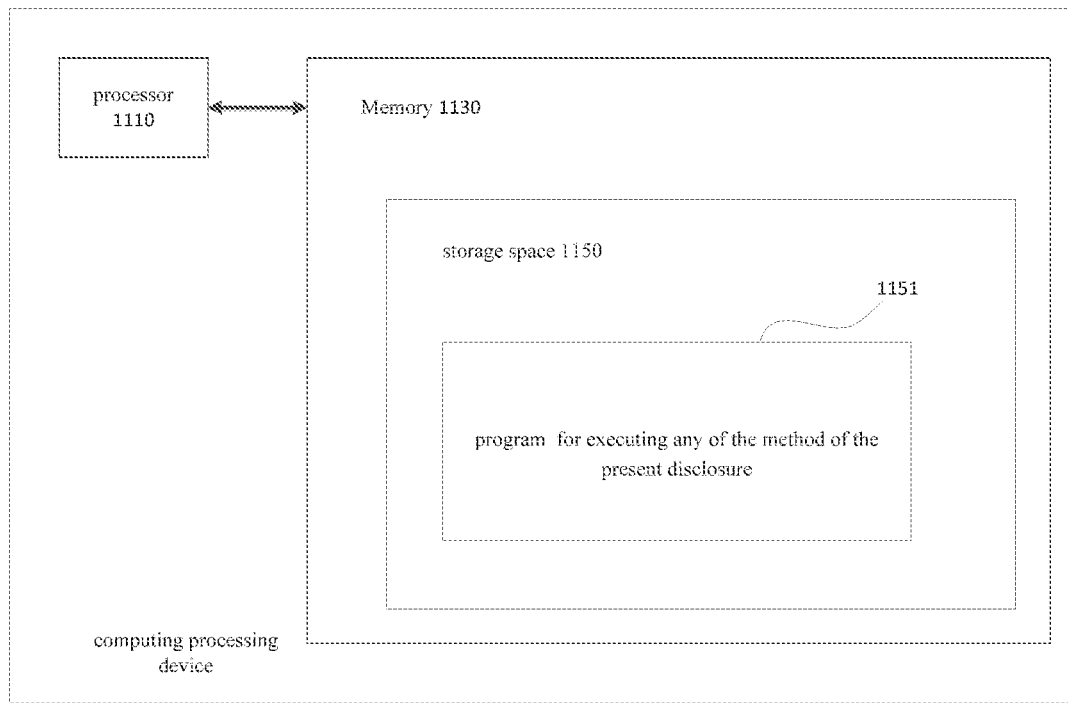
Figure 6:
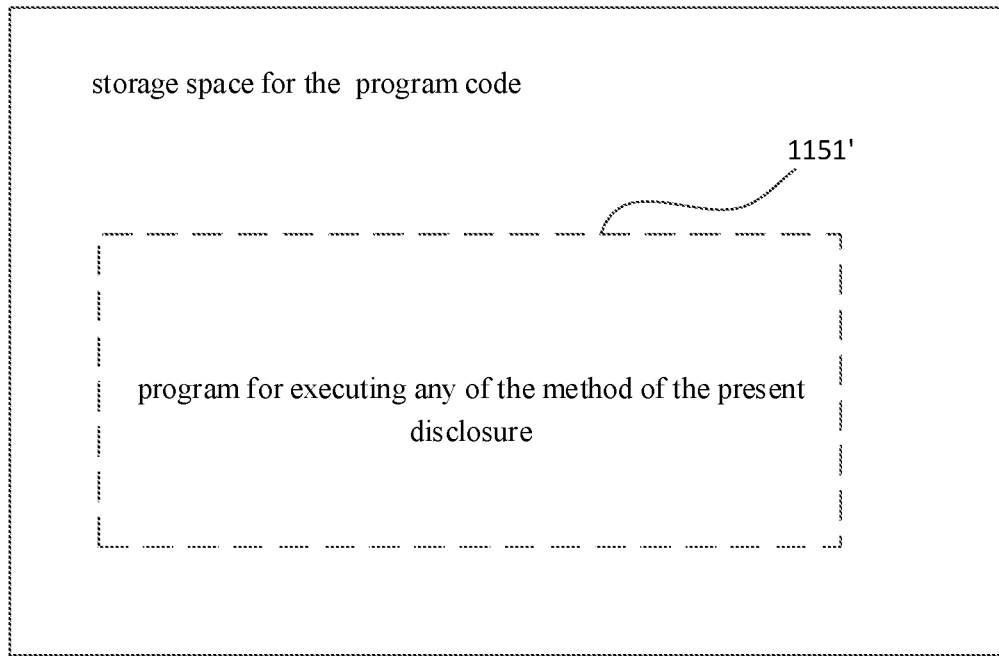

FIG. 5 provides a structure diagram of a computing processing device for an embodiment of the present disclosure; and FIG. 6 provides a schematic diagram of a storage unit for portable or fixed implementation of program code according to the method of the present disclosure.

DETAILED DESCRIPTION

Before introducing the specific embodiments of the present disclosure in detail, the specific application scenarios of the present disclosure are described below. The present disclosure can be applied to the reservation charging process of electric vehicles or hybrid electric vehicles. The reservation charging refers to setting the time for reservation using the vehicle in advance, and connecting the vehicle with the charging gun, and automatically controlling the vehicle to start charging when the time for reservation using the vehicle is reached. For example, the specific process of the reservation charging can be that the user sets the time for reservation using the vehicle through the reservation charging interface of the terminal (which can be a mobile phone, a computer, a smart watch, etc., or a Head Unit System (HUT) in the vehicle, where the mobile phone, the computer, or the smart watch runs an APP related to the reservation charging, and the APP has a reservation charging interface), after the time for reservation using the vehicle is set, the terminal sends the set time for reservation using the vehicle to the TSP. after receiving the time for reservation using the vehicle, the TSP calculates the waiting duration from the start of charging according to the preset calculation strategy, and sends the calculated waiting duration to the telematics box (T-box) in the vehicle to make the T-box start timing, and controls the vehicle charging when the T-box timing duration reaches the waiting duration. However, when the vehicle is located in an underground parking lot, an enclosed garage or other places where the network signal is weak, which often happens that the T-box cannot receive the waiting duration signal sent by the TSP, and the phenomenon that the vehicle is unable to be charged is caused, and the phenomenon leads to the current residual power of the vehicle cannot meet the demand for endurance when the user needs to use the vehicle, which greatly affects the user experience.

In order to solve the above technical problems, the present disclosure provides a method and a device for controlling vehicle charging, and a vehicle. The method by acquiring a current connection state of a telematics box in the vehicle and the server when a charging gun of a vehicle is determined in a connection state; and recording a first duration of the offline state when the current connection state is determined in an offline state, and controlling the vehicle charging according to the first duration. In this way, when it is determined that the current connection state is in the offline state, the vehicle charging can be controlled according to the duration of the offline state, which can effectively avoid the problem of charging failure due to network connection failure during the reservation charging process, the reliability of vehicle reservation charging is improved, and thus the vehicle user experience is effectively improved.

Figure 1:
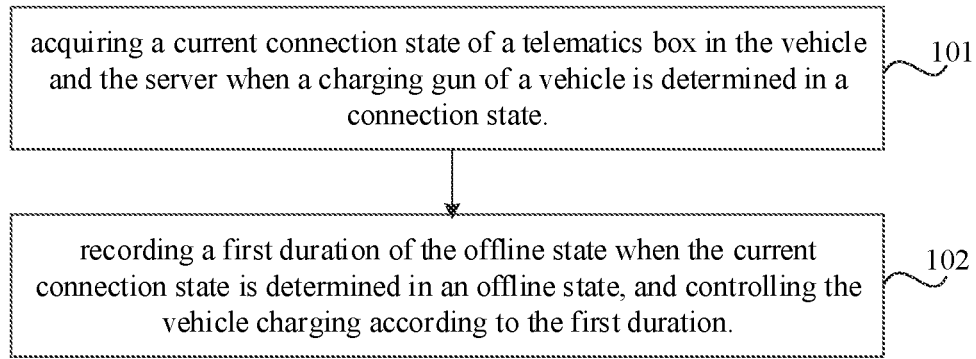
FIG. 1 is a flowchart of a method for controlling vehicle charging shown in an exemplary embodiment of the present disclosure.

FIG. 1 is a flowchart of a method for controlling vehicle charging shown in an exemplary embodiment of the present disclosure; as shown in FIG. 1, the method is applied to a server and can include the following steps:

Step 101, acquiring a current connection state of a telematics box in the vehicle and the server when a charging gun of a vehicle is determined in a connection state.

In which, the current connection state includes an online state and an offline state, and the server can be the server of the Telematics Service Provider (TSP).

In the step, after the user connects the vehicle with the charging gun, the hardware devices involved in the reservation charging function in the vehicle are in the power supply state. The hardware devices can include HUT, T-box, Hybrid Control Unit (HCU) and On Board Charger (OBC). After the user connects the vehicle with the charging gun, the T-box attempts to establish a network connection with the server, when the network connection signal between the T-box and the server is a high-level signal, which indicates that the network connection is normal, and the current connection state is in the online state. When the network connection signal between the T-box and the server is a low-level signal, which indicates that the network connection is abnormal, and the current connection state is in the offline state.

It should be noted that when the vehicle is connected to the charging gun and the OBC in the vehicle acquires the connection signal of the charging gun, the connection signal of the charging gun is sent to the T-box through the gateway. When T-box establishes a network connection with the server, the T-box sends the connection signal of the charging gun to the server. When the server determines to receive the connection signal of the charging gun, it determines that the vehicle is in the connection state of the charging gun.

Step 102, recording a first duration of the offline state when the current connection state is determined in an offline state, and controlling the vehicle charging according to the first duration.

In the step, one of possible implementation methods is that: before the step of acquiring a current connection state of a telematics box in the vehicle and the server, a time for reservation using the vehicle is acquired through a terminal; and a waiting duration from a start of charging is determined according to the time for reservation using the vehicle; the waiting duration is updated according to the first duration to generate a target waiting duration when the first duration is determined to be less than or equal to a preset duration threshold; the target waiting duration is sent to the telematics box to control the vehicle charging when a timing duration of the telematics box reaches the target waiting duration; and the vehicle charging is controlled when the first duration is determined to be greater than the preset duration threshold.

In the above embodiment, the implementation of determining a waiting duration from a start of charging according to the time for reservation using the vehicle includes: acquiring a preset advance charging duration and a power on duration required for fully charging of the vehicle; acquiring a target sum value of the preset advance charging duration and the power on duration; acquiring a second duration between a current time and the time for reservation using the vehicle; determining a second difference between the second duration and the target sum value; and determining the second difference as the waiting duration.

In the above embodiment, the implementation of updating the waiting duration according to the first duration to generate a target waiting duration includes: acquiring a first difference between the waiting duration and the first duration; and determining the first difference as the target waiting duration.

In addition, in the method, further includes sending the waiting duration to the telematics box when the current connection state is determined in an online state, to control the vehicle charging when the timing duration of the telematics box reaches the waiting duration.

In the step, another possible implementation method is that when the first duration is less than or equal to the preset duration threshold, the target number of times that the current connection state between the T-box and the server being in an offline state within the target preset duration is acquired. If the target number of times is determined to be greater than or equal to the preset threshold number of times, then the vehicle charging is controlled; if the target number of times is determined to be less than the preset threshold number of times, the waiting duration is updated according to the first duration to generate the target waiting duration, and the target waiting duration is sent to the T-box to control the vehicle charging when the T-box timing duration reaches the target waiting duration. The specific embodiment of updating the waiting duration according to the first duration to generate the target waiting duration can be referred to the relevant description in the first embodiment in the step, and the disclosure will not be repeated here.

In the above embodiments, the implementation method to acquire the target number of times that the current connection state between T-box and the server is in the offline state within the target preset time period can be to record the time when the current connection state between T-box and the server is in the offline state each time, and the number of times that the offline state occurs within the target preset time period before the current time according to the time is determined when the offline state occurs each time, and the number of times that the target appears offline state in the preset time period before the current time is determined as the target number of times. In this way, when the target number of times is greater than or equal to the preset threshold number of times, the vehicle charging is directly controlled to effectively avoid the problem of low reliability of reservation charging caused by unstable network connection state, thus the vehicle user experience is effectively improved.

The above technical solution can control the vehicle charging according to the duration of the offline state when the current connection state is determined to be in the offline state, which can effectively avoid the problem of charging failure due to network connection failure during the reservation charging process, the reliability of vehicle pre-reservation charging is improved, and thus the vehicle user experience is effectively improved.

Figure 2:
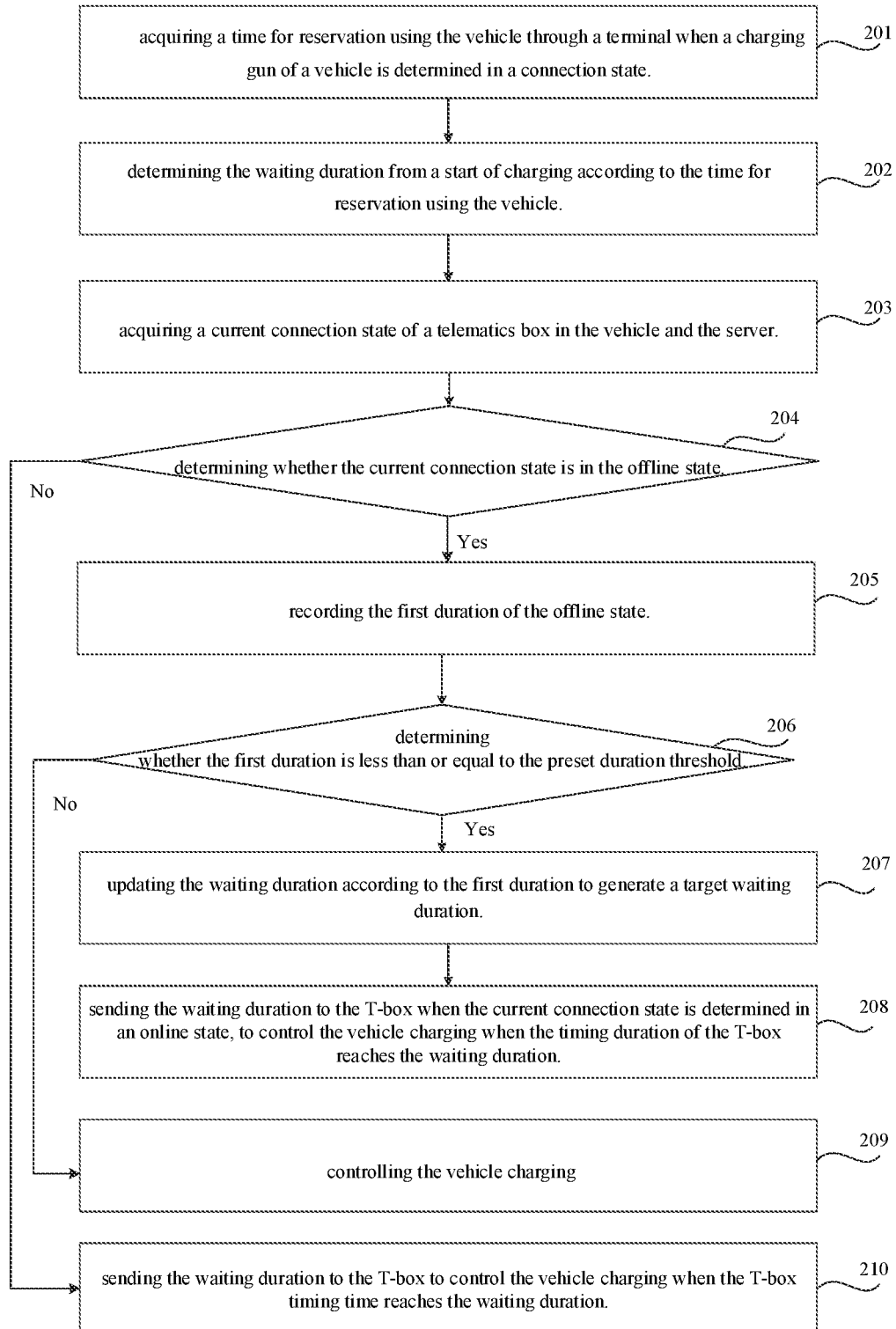
FIG. 2 is a flowchart of a method for controlling vehicle charging shown in another exemplary embodiment of the present disclosure.

FIG. 2 is a flowchart of a method for controlling vehicle charging shown in another exemplary embodiment of the present disclosure; as shown in FIG. 2, the method is applied to the server and can include the following steps:

Step 201, acquiring a time for reservation using the vehicle through a terminal when a charging gun of a vehicle is determined in a connection state.

When the vehicle is connected to the charging gun, the OBC in the vehicle acquires the connection signal of the charging gun, and sends the connection signal of the charging gun to T-box through the gateway. The T-box sends the connection signal of the charging gun to the server when the T-box establishes a network connection with the server. When the server is determined to receive the connection signal of the charging gun, the vehicle is determined to be in the charging gun connection state.

In a possible implementation method in the step is that the terminal is a mobile phone, a personal computer, a tablet computer, or a smart watch, etc.

The terminal can run an APP with reservation charging on the terminal. The user can use the preset interface in the APP to input the time for reservation using the vehicle. After the terminal confirms that the user has entered the time for reservation using the vehicle, the time for reservation using the vehicle is sent to the server through Ethernet, and the server acquires the time for reservation using the vehicle by receiving the time for reservation using the vehicle sent by the terminal.

Another possible implementation method in the step is that the terminal is the HUT, and the user sets the time for reservation using the vehicle through the HUT, and the HUT sends the time for reservation using the vehicle to the server through the T-box after determining that the user has inputted the time for reservation using the vehicle, so that the server can acquire the time for reservation using the vehicle.

Step 202, determining the waiting duration from a start of charging according to the time for reservation using the vehicle.

In the step, acquiring a preset advance charging duration and a power on duration required for fully charging of the vehicle; acquiring a target sum value of the preset advance charging duration and the power on duration; acquiring a second duration between a current time and the time for reservation using the vehicle; determining a second difference between the second duration and the target sum value; and determining the second difference as the waiting duration.

It should be noted that the implementation method of acquiring the power on duration required for fully charging of the vehicle includes: storing a correspondence table between a remaining power and the power on duration in the server in advance, and querying to determine the power on duration required by the vehicle under a current remaining power condition through the preset correspondence table when the current remaining power of the vehicle is acquired.

For example, the time for reservation using the vehicle inputted by the user is 8:00 a.m., the pre charging duration preset in the server is 3 hours, and the time for reservation using the vehicle inputted is 21:00, then the second duration is 11 hours, and the current remaining power of the vehicle acquired is 20%. By looking up the table, it is determined that the power on duration required for fully charging of the vehicle corresponding to the remaining power is 1.5 hours, the target sum value of the power on duration and the pre charging duration is 4.5 hours, and the second difference is 6.5 hours.

Step 203, acquiring a current connection state of a telematics box in the vehicle and the server.

The current connection state includes the online state and the offline state.

Step 204, determining whether the current connection state is in the offline state.

In the step, step 205 is executed when the current connection state is determined to be in the offline state, and step 210 is executed when the current connection state is determined to be in the online state.

It should be noted that when the network connection signal between the T-box and the server is a high-level signal, which indicates that the network connection is normal, and the current connection state is in the online state. When the network connection signal between the T-box and the server is a low-level signal, which indicates that the network connection is abnormal, and the current connection state is in the offline state.

Step 205, recording the first duration of the offline state.

In the step, a possible embodiment is that the server is provided with a timer. When the vehicle is determined in the connection state of the charging gun, and when the current connection state first acquired is in the offline state, the timer starts timing. When the timing duration is greater than the preset duration threshold, the timer stops timing to acquire the first duration; or, when the current connection state first acquired is in the offline state, the timer starts timing until the current connection state acquired is in the online state, the timer stops timing to acquire the first duration.

Step 206, determining whether the first duration is less than or equal to the preset duration threshold.

In the step, when the first duration is determined to be less than or equal to the preset duration threshold, step 207 is executed, and when the first duration is determined to be greater than the preset duration threshold, step 209 is executed.

Step 207, updating the waiting duration according to the first duration to generate a target waiting duration.

In the step, the first difference between the waiting duration and the first duration can be acquired, to determine the first difference as the target waiting duration.

For example, the example in step 202 above is taken as an example to illustrate that if the waiting duration is 6.5 hours and the first duration is 0.5 hours, the target waiting duration can be 6 hours.

Step 208, sending the waiting duration to the T-box when the current connection state is determined in an online state, to control the vehicle charging when the timing duration of the T-box reaches the waiting duration.

In the step, because the first duration is less than or equal to the preset duration threshold, which indicates that the current connection state is first in the offline state and then changes to be in the online state after the first duration. Therefore, during the first duration, the server can send the target waiting duration to the T-box, so that when the T-box timing duration reaches the target waiting duration, the T-box sends a charging command to the HCU in the vehicle, and after the HCU receives the charging command, the HCU controls the vehicle charging.

Step 209, controlling the vehicle charging.

It should be noted that when the first duration is greater than the preset duration threshold, stopping timing and sending the reservation charging failure signal to the terminal through Ethernet. After the terminal receives the reservation charging failure signal, the terminal sends the immediate charging command to the HCU, so that the HCU controls the vehicle to start charging. In this way, when the T-box is disconnected from the server for a long time, the server can send a reservation charging failure signal to the terminal through Ethernet, so that the terminal can control the vehicle to charge immediately, which can effectively avoid the phenomenon of charging failure due to the network failure between the T-box and the server in the vehicle during the reservation charging process, the vehicle charging can be ensured, the problem of poor user experience caused by the failure of reservation charging is avoided.

Step 210, sending the waiting duration to the T-box to control the vehicle charging when the T-box timing time reaches the waiting duration.

In the step, when the timing duration of the T-box reaches the waiting duration, the server sends a charging command to the HCU in the vehicle, and after the HCU receives the charging command, the HCU controls the vehicle charging.

In the above technical solutions, the phenomenon of vehicle charging failure caused by T-box disconnection in the vehicle during the reservation charging process can be avoided, the reliability of reservation charging can be effectively improved, so as to effectively improve the vehicle user experience.

Figure 3:
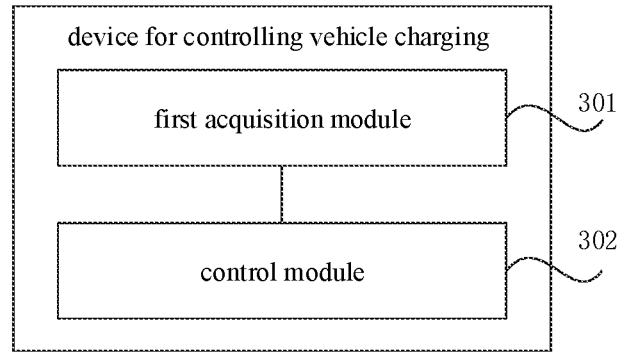
FIG. 3 is a block diagram of a device for controlling vehicle charging shown in another exemplary embodiment of the present disclosure.

FIG. 3 is a block diagram of a device for controlling vehicle charging shown in another exemplary embodiment of the present disclosure; as shown in FIG. 3, the device can include:
- a first acquisition module 301, configured for acquiring a current connection state of a telematics box in the vehicle and the server when a charging gun of a vehicle is determined in a connection state; and
- a hybrid control unit 302, configured for recording a first duration of an offline state when the current connection state is determined in the offline state, and controlling the vehicle charging according to the first duration.

In the above technical solution, the first acquisition module 301 acquires a current connection state of a telematics box in the vehicle and the server when a charging gun of a vehicle is determined in a connection state; and the hybrid control unit 302 records a first duration of an offline state when the current connection state is determined in the offline state, and controlling the vehicle charging according to the first duration. In this way, when it is determined that the current connection state is in the offline state, the vehicle charging can be controlled according to the duration of the offline state, which can effectively avoid the problem of charging failure due to network connection failure during the reservation charging process, the reliability of vehicle reservation charging is improved, and thus the vehicle user experience is effectively improved.

Figure 4:
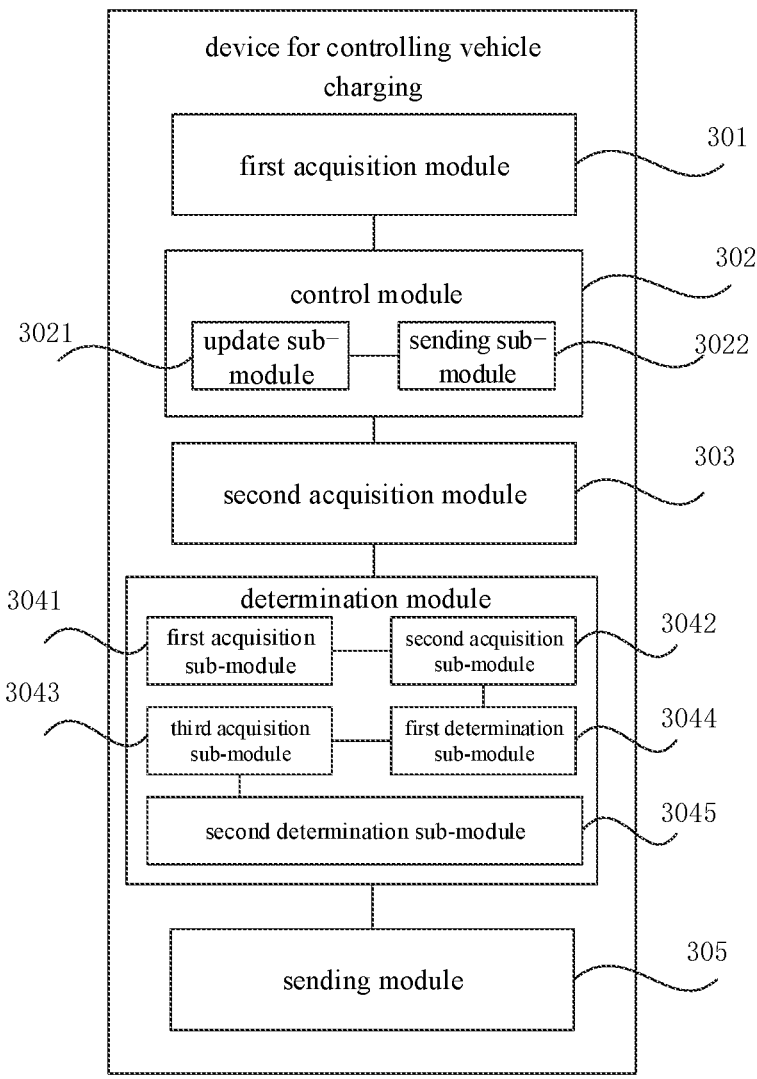
FIG. 4 is a block diagram of a device for controlling vehicle charging shown in accordance with the embodiment shown in FIG. 3.

FIG. 4 is a block diagram of a device for controlling vehicle charging shown in accordance with the embodiment shown in FIG. 3; as shown in FIG. 4, the device further includes:
- a second acquisition module 303, configured for acquiring a time for reservation using the vehicle through a terminal; and
- a determination module 304, configured for determining a waiting duration from a start of charging according to the time for reservation using the vehicle;
- accordingly, the hybrid control unit 302 includes:
- an update sub-module 3021, configured for updating the waiting duration according to the first duration to generate a target waiting duration when the first duration is determined to be less than or equal to a preset duration threshold; and
- a sending sub-module 3022, configured for sending the target waiting duration to the telematics box, to control the vehicle charging when a timing duration of the telematics box reaches the target waiting duration.

In an embodiment, the update sub-module 3021 is configured for:
- acquiring a first difference between the waiting duration and the first duration; and
- determining the first difference as the target waiting duration.

In an embodiment, the determination module 304 includes:
- a first acquisition sub-module 3041, configured for acquiring a preset advance charging duration and a power on duration required for fully charging of the vehicle;
- a second acquisition sub-module 3042, configured for acquiring a target sum value of the preset advance charging duration and the power on duration;
- a third acquisition sub-module 3043, configured for acquiring a second duration between a current time and the time for reservation using the vehicle;
- a first determination sub-module 3044, configured for determining a second difference between the second duration and the target sum value; and
- a second determination sub-module 3045, configured for determining the second difference as the waiting duration.

In an embodiment, the device further includes:
- a sending module 305, configured for sending the waiting duration to the telematics box when the current connection state is determined in an online state, to control the vehicle charging when the timing duration of the telematics box reaches the waiting duration.

In an embodiment, the hybrid control unit 302 is further configured for:
controlling the vehicle charging when the first duration is determined to be greater than the preset duration threshold.

The above technical solution can avoid the phenomenon of vehicle charging failure caused by T-box disconnection in the vehicle during the reservation charging process, and the reliability of reservation charging can be effectively improved, thus the vehicle user experience is effectively improved.

In another exemplary embodiment of the present disclosure, a vehicle is shown, which includes the device for controlling vehicle charging described in FIG. 3 or FIG. 4 above.

As for the device in the above embodiment, the specific method of each module to perform operation has been described in detail in the embodiment of the method, and will not be described in detail here.

In order to implement the above embodiments, the present disclosure further provides a computing processing device, which includes:
- a memory, computer readable codes are stored therein; and
- at least one processor;
- when the computer-readable codes are executed by the at least one processor, the computing processing device executes the method for controlling vehicle charging mentioned above.

In order to implement the above embodiments, the present disclosure further provides a computer-readable storage medium in which the aforementioned computer programs are stored FIG. 5 provides a structural schematic diagram of a computing processing device for the embodiment of the present disclosure. The computing processing apparatus typically includes a processor 1110 and a computer program product (non-transitory computer readable storage medium having instructions, which when executed by a processor, perform actions) or computer-readable medium in the form of a memory 1130. The memory 1130 may be an electronic memory such as flash memory, electrically erasable programmable read only memory (EEPROM), EPROM, hard disk, or ROM. The memory 1130 has a storage space 1150 of program code 1151 for executing any of the method steps described above. For example, the storage space 1150 for program code may include each program code 1151 for implementing various steps in the above method. These program codes can be read from or written into one or more computer program products. These computer program products include program code carriers such as hard disk, compact disc (CD), memory card, or floppy disk. Such a computer program product is usually a portable or fixed storage unit as shown in FIG. 6. The storage unit may have storage segments, storage spaces, and the like arranged similarly to the memory 1130 in the server of FIG. 5. The program code may be compressed in an appropriate form, for example. Generally, the storage unit includes computer readable code 1151', that is, codes that can be read by a processor such as 1110, when the codes are run by a server, which causes the server to perform the steps in the method described above.

In the description of the specification, reference to the description of the terms "one embodiment", "some embodiments", "examples", "specific examples", or "some examples" means that specific features, structures, materials, or features described in combination with the embodiment or example are included in at least one embodiment or example of the present disclosure. In this specification, the illustrative expression of the above terms need not refer to the same embodiments or examples. Furthermore, the specific features, structures, materials, or features described may be combined in an appropriate manner in any one or more embodiments or examples. In addition, those skilled in the art can combine and combine different embodiments or examples described in this specification and the characteristics of different embodiments or examples without contradiction.

In addition, the terms "first" and "second" are only used for description purposes and cannot be understood as indicating or implying relative importance or implicitly indicating the number of indicated technical features. Thus, the features defined as "first" and "second" can explicitly or implicitly include at least one such feature. In the description of this disclosure, "multiple" means at least two, such as two, three, etc., unless otherwise specifically defined.

Any process or method description in the flowchart or otherwise described herein can be understood as representing a module, segment or part of code including one or more executable instructions for implementing the steps of a custom logic function or process, and the scope of the embodiments of the present disclosure includes additional implementations, which may not be in the order shown or discussed, It should be understood by those skilled in the art of the embodiments of the present disclosure that functions are performed in a substantially simultaneous manner or in reverse order according to the functions involved.

The logic and/or steps represented in the flowchart or otherwise described herein, for example, can be considered as a sequenced list of executable instructions for implementing logic functions, which can be specifically implemented in any computer-readable medium for the instruction execution system, device or apparatus (such as a computer based system, a system including a processor, or other system that can take instructions from and execute instructions from an instruction execution system, device, or apparatus) is used, or is used in combination with, an instruction execution system, device, or apparatus. For the purposes of the specification, a "computer-readable medium" may be any device that may include, store, communicate, propagate, or transmit programs for use by or in conjunction with instruction execution system, device, or apparatus. More specific examples (non-exhaustive list) of computer-readable media include the following: an electrical connector (electronic device) with one or more wiring, a portable computer disk box (magnetic device), a random-access memory (RAM), a read-only memory (ROM), an erasable and editable read-only memory (EPROM or flash memory), an optical fiber device, and a portable optical disk read-only memory (CDROM). In addition, the computer-readable medium can even be a paper or other suitable medium on which the program can be printed, because the program can be acquired electronically, for example, by optical scanning of the paper or other medium, then editing, interpreting, or processing in other suitable ways when necessary, and then stored in a computer memory.

It should be understood that the various parts of the present disclosure may be implemented in hardware, software, firm ware, or a combination thereof. In the above embodiments, a plurality of steps or methods may be implemented with software or firmware stored in memory and executed by a suitable instruction execution system. For example, if the hardware implementation is the same as that in another embodiment, it can be realized by any one of the following technologies known in the art or their combination: discrete logic circuit with logic gate circuit for realizing logic function on data signal, special integrated circuit with suitable combined logic gate circuit, programmable gate array (PGA), field programmable gate array (FPGA), etc.

Those skilled in the art can understand that all or part of the steps carried by the method of implementing the above embodiments can be completed by instructing relevant hardware through a program. The program can be stored in a computer-readable storage medium. When the program is executed, it includes one or a combination of the steps of the method embodiment.

In addition, each functional unit in each embodiment of the present disclosure can be integrated in a processing module, or each unit can exist physically independently, or two or more units can be integrated in a module. The above integrated modules can be implemented in the form of hardware or software function modules. If the integrated module is realized in the form of a software functional module and sold or used as an independent product, it can also be stored in a computer readable storage medium.

The storage medium mentioned above can be read-only memory, disk or optical disk.

Although the present invention has been disclosed in the form of embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. A method for controlling vehicle charging, applied to a server, the method comprising:
   acquiring, through a head unit system, a current connection state of a telematics box in a vehicle and the server when a charging gun of the vehicle is determined in a connection state; and
   recording, through a timer in the server, a first duration of an offline state when the current connection state is determined in the offline state, and controlling, through a hybrid control unit, the vehicle charging according to the first duration;
   wherein the step of controlling the vehicle charging according to the first duration enables to complete a reservation charging process in a case that network connection failure of the vehicle.

2. The method according to claim 1, wherein before the step of acquiring the current connection state of the telematics box in the vehicle and the server, further comprising:
acquiring a time for reservation using the vehicle through a terminal; and
determining a waiting duration from a start of charging according to the time for reservation using the vehicle;
wherein the step of controlling the vehicle charging according to the first duration comprises:
updating the waiting duration according to the first duration to generate a target waiting duration when the first duration is determined to be less than or equal to a preset duration threshold; and
sending the target waiting duration to the telematics box to control the vehicle charging when a timing duration of the telematics box reaches the target waiting duration.

3. The method according to claim 2, wherein the step of updating the waiting duration according to the first duration to generate the target waiting duration comprises:
acquiring a first difference between the waiting duration and the first duration; and
determining the first difference as the target waiting duration.

4. The method according to claim 2, wherein the step of determining the waiting duration from the start of charging according to the time for reservation using the vehicle comprises:
acquiring a preset advance charging duration and a power on duration required for fully charging of the vehicle;
acquiring a target sum value of the preset advance charging duration and the power on duration;
acquiring a second duration between a current time and the time for reservation using the vehicle;
determining a second difference between the second duration and the target sum value; and
determining the second difference as the waiting duration.

5. The method according to claim 2, further comprising:
sending the waiting duration to the telematics box when the current connection state is determined in an online state, to control the vehicle charging when the timing duration of the telematics box reaches the waiting duration.

6. The method according to claim 2, wherein the step of controlling the vehicle charging according to the first duration comprises:
controlling the vehicle charging when the first duration is determined to be greater than the preset duration threshold.

7. A device for controlling vehicle charging, applied to a server, and comprising:
one or more processors and a storage device; and
the storage device stores a computer program which, when executed by the processor, performs operations comprising:
acquiring, through a head unit system, a current connection state of a telematics box in a vehicle and the server when a charging gun of the vehicle is determined in a connection state; and
recording, through a timer in the server, a first duration of an offline state when the current connection state is determined in the offline state, and controlling, through a hybrid control unit, the vehicle charging according to the first duration;
wherein the step of controlling the vehicle charging according to the first duration enables to complete a reservation charging process in a case that network connection failure of the vehicle.

8. The device according to claim 7, wherein the operation of the device comprises:
acquiring a time for reservation using the vehicle through a terminal; and
determining a waiting duration from a start of charging according to the time for reservation using the vehicle;
the hybrid control unit is further configured to performs operations:
updating the waiting duration according to the first duration to generate a target waiting duration when the first duration is determined to be less than or equal to a preset duration threshold; and
sending the target waiting duration to the telematics box, to control the vehicle charging when a timing duration of the telematics box reaches the target waiting duration.

9. The device according to claim 8, wherein the hybrid control unit is further configured to performs operations:
acquiring a first difference between the waiting duration and the first duration; and
determining the first difference as the target waiting duration.

10. The device according to claim 8, wherein the hybrid control unit is further configured to performs operations:
acquiring a preset advance charging duration and a power on duration required for fully charging of the vehicle;
acquiring a target sum value of the preset advance charging duration and the power on duration;
acquiring a second duration between a current time and the time for reservation using the vehicle;
determining a second difference between the second duration and the target sum value; and
determining the second difference as the waiting duration.

11. The device according to claim 8, wherein the operations of the device comprise:
sending the waiting duration to the telematics box when the current connection state is determined in an online state, to control the vehicle charging when the timing duration of the telematics box reaches the waiting duration.

12. The device according to claim 8, wherein the hybrid control unit is further configured for:
controlling the vehicle charging when the first duration is determined to be greater than the preset duration threshold.

13. A vehicle, comprising a device for controlling vehicle charging, wherein the device is applied to a server, and comprising:
one or more processors and a storage device; and
the storage device stores a computer program which, when executed by the processor, performs operations comprising:
acquiring, through a head unit system, a current connection state of a telematics box in a vehicle and the server when a charging gun of the vehicle is determined in a connection state; and
recording, through a timer in the server, a first duration of an offline state when the current connection state is determined in the offline state, and controlling, through a hybrid control unit, the vehicle charging according to the first duration;
wherein the step of controlling the vehicle charging according to the first duration enables to complete a reservation charging process in a case that network connection failure of the vehicle.

14. A non-transitory computer-readable storage medium, wherein the computer-readable storage medium stores a computer-readable code, and when the computer-readable code is executed, to perform:
- acquiring, through a head unit system, a current connection state of a telematics box in a vehicle and the server when a charging gun of the vehicle is determined in a connection state; and
- recording, through a timer in the server, a first duration of an offline state when the current connection state is determined in the offline state, and controlling, through a hybrid control unit, the vehicle charging according to the first duration;
- wherein the step of controlling the vehicle charging according to the first duration enables to complete a reservation charging process in a case that network connection failure of the vehicle.

15. The vehicle according to claim 13, wherein the operations of the device comprises:
- acquiring a time for reservation using the vehicle through a terminal; and
- determining a waiting duration from a start of charging according to the time for reservation using the vehicle;
- wherein the hybrid control unit is further configured to performs operations:
- updating the waiting duration according to the first duration to generate a target waiting duration when the first duration is determined to be less than or equal to a preset duration threshold; and
- sending the target waiting duration to the telematics box, to control the vehicle charging when a timing duration of the telematics box reaches the target waiting duration.

16. The vehicle according to claim 13, wherein the hybrid control unit is further configured to performs operations:
- acquiring a first difference between the waiting duration and the first duration; and
- determining the first difference as the target waiting duration.

17. The vehicle according to claim 13, wherein the hybrid control unit is further configured to performs operations:
- acquiring a preset advance charging duration and a power on duration required for fully charging of the vehicle;
- acquiring a target sum value of the preset advance charging duration and the power on duration;
- acquiring a second duration between a current time and the time for reservation using the vehicle;
- determining a second difference between the second duration and the target sum value; and
- determining the second difference as the waiting duration.

18. The vehicle according to claim 13, wherein the operations of the device comprise:
- sending the waiting duration to the telematics box when the current connection state is determined in an online state, to control the vehicle charging when the timing duration of the telematics box reaches the waiting duration.

19. The vehicle according to claim 15, wherein the hybrid control unit is further configured for:
- controlling the vehicle charging when the first duration is determined to be greater than the preset duration threshold.

* * * * *